June 2, 1959     K. B. SORENSEN     2,888,995
HITCH DEVICE
Filed Nov. 17, 1954                                 2 Sheets-Sheet 1
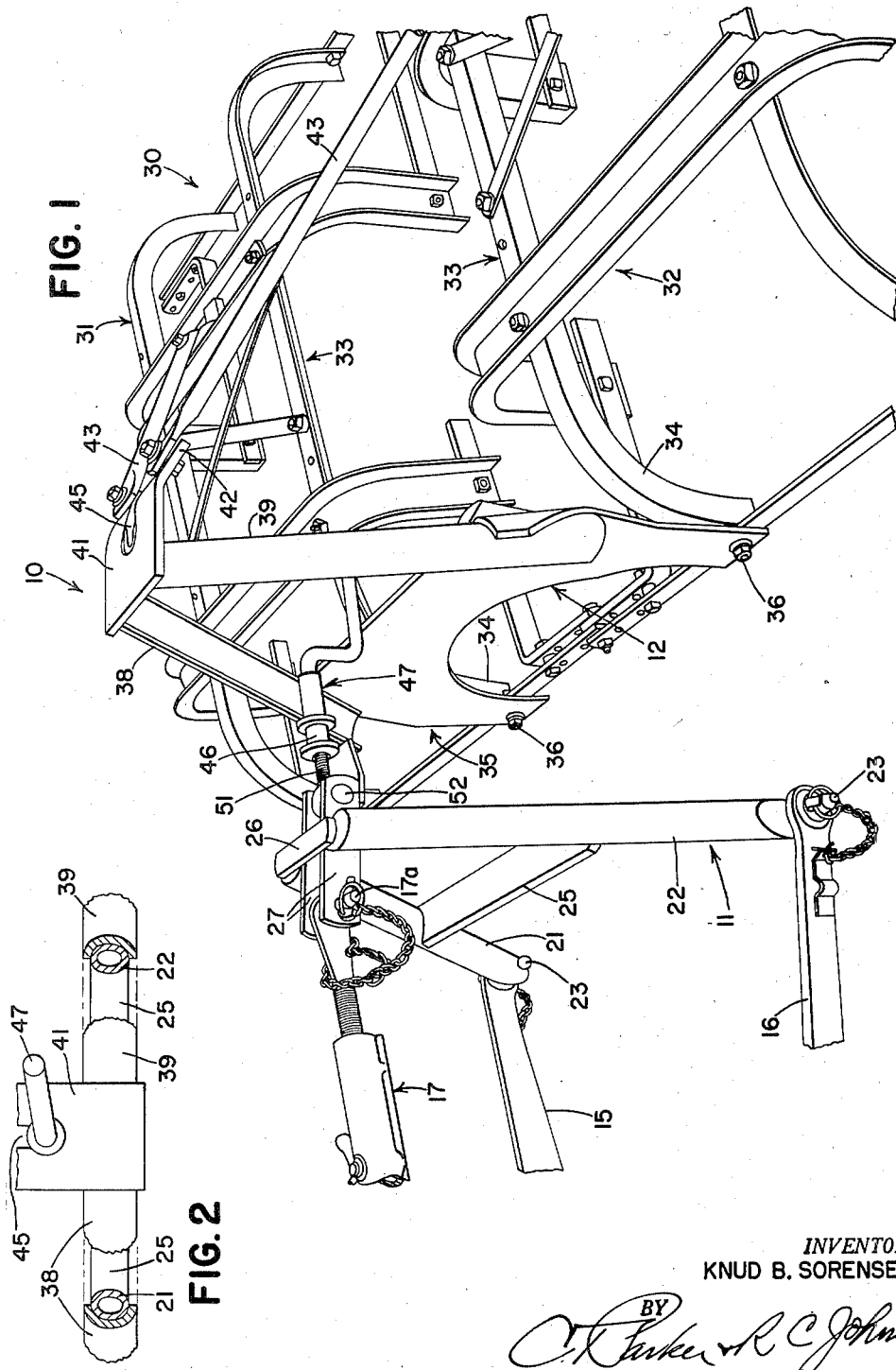
INVENTOR.
KNUD B. SORENSEN
BY
ATTORNEYS June 2, 1959  K. B. SORENSEN  2,888,995
HITCH DEVICE
Filed Nov. 17, 1954  2 Sheets-Sheet 2
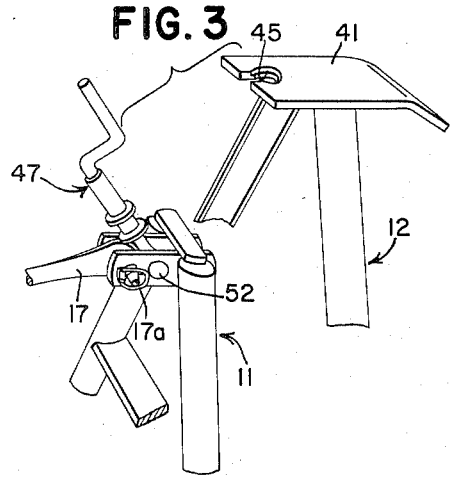
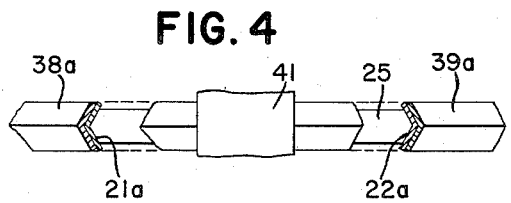
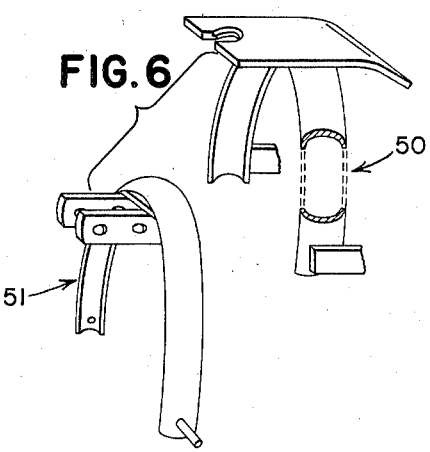
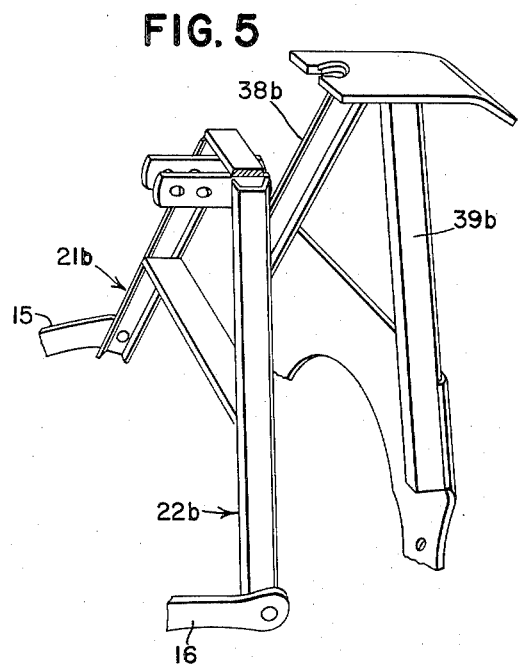
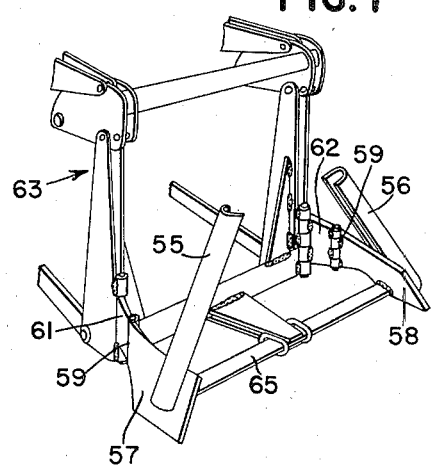
*INVENTOR.*
KNUD B. SORENSEN
ATTORNEYS

United States Patent Office 2,888,995
Patented June 2, 1959

2,888,995
HITCH DEVICE

Knud B. Sorensen, Rock Island, Ill., assignor, by mesne assignments, to Deere & Company, a corporation of Delaware Application November 17, 1954, Serial No. 469,484

12 Claims. (Cl. 172—272)

The present invention relates generally to agricultural implements and more particularly to new and improved means for connecting implements and the like to a propelling and supporting tractor.

The object and general nature of the present invention is the provision of new and improved hitch means whereby implements may readily be connected to and disconnected from a propelling tractor without requiring the operator to dismount from the tractor in order to effect a connection or disconnection. More specifically, it is a feature of this invention to provide hitch means in the form of a pair of nestable frames, one connected with the tractor and the other with the implement, so constructed and arranged that operation of the tractor lift means serves to move the inner frame into nested and interconnected relation with respect to the outer frame, which movement without others serves to rigidly and positively connect the implement to the tractor to be propelled thereby and to be raised and lowered by operation of the tractor power lift. An additional feature of this invention is the provision of means for locking the interconnected frames in connected relation, which locking meas may readily be operated by the operator at his station on the tractor.

These and other objects and advantages of the present invention will be apparent to those skilled in the art after a consideration of the following detailed description, taken in conjunction with the accompanying drawings in which the preferred form of the invention has been shown by way of illustration.

In the drawings:

Fig. 1 is a fragmentary perspective view showing the tractor-carried and implement-carried frame sections in the positions they occupy just prior to connection of the implement to the tractor.

Fig. 2 is a fragmentary sectional view taken through the tractor and implement frame sections when the latter are in their nested or interconnected relation.

Fig. 3 is a view similar to Fig. 1 but more fragmentary, showing a modified arrangement of the frame interlocking latch means.

Figure 4 is a view similar to Figure 2, showing a modified form of construction.

Fig. 5 shows a further modified form of interlocking frame arrangement.

Fig. 6 is another modified form of interlocking frame arrangement, using, for example, arcuate members.

Fig. 7 shows a still further modified form of this invention.

Referring first to Fig. 1, the hitch means of the present invention is indicated in its entirety by the reference numeral 10 and comprises a pair of A-frame sections 11 and 12 of particular construction. The frame section 11 is adapted to be connected to the propelling tractor which, in Fig. 1, is represented by the two lower draft links 15 and 16 and the upper thrust or compression link 17, which upper and lower links normally form a part of a conventional farm tractor having the well-known three-link hitch system with power means for raising and lowering the lower draft links. A tractor and power lift system of this kind is shown in the patent to Ferguson 2,118,180, issued May 24, 1938, to which reference may be made if necessary. The frame section 11 is formed with generally downwardly diverging tubular legs 21 and 22, the lower ends of which carry laterally outwardly extending studs 23 which serve as means receiving the rear apertured ends of the draft links 15 and 16. The downwardly diverging side members 21 and 22 of the frame 11 are reinforced by a crossbar 25 and at their upper ends are connected by a short upper bar 26 to which a pair of fore-and-aft extending bars 27 are fixed, as by welding. The forward ends of the bars 27 are apertured and serve as means for pivotally receiving the rear end of the upper or thrust link 17 of the tractor.

The implement with which the present invention is associated, as shown by way of illustration in the drawings, is indicated in its entirety by the reference numeral 30 and comprises right- and left-hand rotary hoe sections 31 and 32, each section including a generally fore-and-aft extending bar 33 having a downturned front end portion 34. The frame section 12, which is the frame section that is adapted to be connected to the implement to be propelled and supported, comprises a lower attaching plate member 35 carrying bolts 36 or other suitable means by which the frame section 12 is adapted to be connected with the implement 30. Secured to the upper and laterally outer portions of the plate member 35 is a pair of upwardly converging side bars 38 and 39, each generally U-shaped in cross section and connected at their upper converging ends by a generally horizontal attaching plate section 41, the rear portion 42 of which is bent downwardly to receive rods 43 that connect the rear portions of the implements 30 with the upper portion of the frame 12. The plate member 41 is provided with a rearwardly facing notch 45 in which the spool section 46 of a locking member 47 is adapted to be disposed when the two frame sections 11 and 12 are in interconnected or nested relation.

Since the frame bars 38 and 39, which form side portions upwardly converging in arrangement, of the implement-receiving frame section 12 are generally U-shaped or semicircular in section, as best shown in Fig. 2, and since the side portions 21 and 22 of the tractor-carried frame section have substantially the same angularity as the side portions 38 and 39 of the frame section 10, when the tractor-carried frame section is brought into position within the implement frame section 10 and then raised, the parts 21 and 22 nest snugly within the members 38 and 39, whereby the two frame sections are rigidly and positively interconnected, and such interconnection is established by the mere act of bringing one frame section upwardly into nested relation with respect to the other, the two sections being more or less wedgingly held together.

The locking member 47 is in the nature of a crank having an inner screw-threaded portion that is threaded onto an eye bolt 51 pivotally connected, as by a pin 52, with the rear end of the attachment bars 27. Therefore, when the frame sections are in their interconnected or nested relation, the crank member 47 may be swung upwardly to carry the screw section 46 into the notch 45, and then the crank section 47 may be turned to tighten the tractor-carried frame into firmly interconnected relation with the implement-carried frame 12. Similarly, when it is desired to disconnect the implement, the crank screw 47 may be turned in the opposite direction to loosen the parts, and then the tractor links 15 and 16 may be lowered, as by proper operation of the tractor hydraulic system, after the crank 47 has been released from the notch 45 and swung rearwardly into a position to permit the frame 11 to be separated, as by driving the tractor forwardly, from the implement-carried frame 12.

When backing the tractor-carried frame section into position with the implement frame section, the operator can tell when the sections are disposed for convenient nesting by the fact that the tractor-carried frame section contacts the plate 35 when the frame sections are in a position for nesting when the implement frame section is raised.

If desired, the notch 45 may be formed on the forward side of the plate member 41, and the crank 47 pivoted to the forward portions of the bars 27, as is illustrated in Fig. 3, either on its own pivot pin 52, or on the upper rear link pivot 17a, as desired. The crank 47 represents any suitable frame locking or holding means.

In Fig. 4 I have shown another modified form of the present invention, wherein the tractor-carried leg members 21a and 22a are of generally angular construction, together with the cooperating implement leg members 38a and 39a. Thus, the present invention, as illustrated in the drawings, is not limited to having the tractor-carried leg members be in the form of tubular parts or the implement-carried frame members be in the form of parts of arcuate cross-section.

Fig. 5 shows an arrangement somewhat similar to that shown in Fig. 3, with the latch means mounted on the tractor-carried frame section, but arranged with the tractor-carried frame leg members 21b and 22b in the form of channels, and similarly the implement-carried frame legs 38b and 39b are also in the form of channels so dimensioned or otherwise constructed so as to permit the frame sections to be nested in the manner shown in Figs. 2 and 4.

It will be understood, of course, that the rotary hoe sections shown in Fig. 1 are illustrative of any suitable form or type of agricultural implement.

Fig. 6 is a still further modification of the present invention, wherein the implement frame section includes a generally arcuate, continuously curving member 50 and the tractor-carried frame section includes a similar member 51 of substantially the same construction except that the radius of curvature is slightly less than that of the member 50. Both members are parts that are generally arcuate in cross section, somewhat like the leg portions 38 and 39, described above, the member 50 being somewhat larger than the member 51.

Fig. 7 shows another modification of the present invention wherein the tractor-carried frame section that is adapted to cooperate with the implement frame section 12 (Fig. 1) is constructed so as to include a pair of separated members 55 and 56 arranged at an angle to another, corresponding to the angles between the frame sections 38 and 39. The tractor-carried frame members 55 and 56 are arcuate in cross section, but they may be made of angular cross section or channel cross section if they are intended to cooperate with implement-carried frame sections like those shown in Figs. 3 and 5 and described above. In the form of the invention shown in Fig. 7, the implement frame-engaging members 55 and 56 are shown as secured at their lower ends to plates 57 and 58 that are hinged, as at 59, to a pair of sway links 61 and 62 that form a part of a tractor-carried hitch structure, indicated in its entirety by the reference numeral 63 and corresponding to that shown and claimed in U.S. Patent 2,616,349, issued November 4, 1952, to Lindeman et al.

The two angularly related members 55 and 56 and their associated plates 57 and 58, to which they are secured, as by welding, are rigidly interconnected by a crossbar 65. Thus, the angularly related members 55 and 56 form the equivalent of an A-frame with the upper portion including a generally central open unobstructed space. This form of invention may be employed wherever desirable, particularly where latching means, such as that shown at 47 in Fig. 1, is not required.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a hitch device for connecting an implement to a tractor that includes power operated elevatable lifting means, the combination of a pair of A-frames, one being adapted to fit complementarily within the other, said elevatable means including upper and lower generally vertically swingable links, means to connect said one frame with the rear ends of the upper and lower links of said elevatable means whereby said one frame is shiftable generally vertically but is held against tilting in a generally fore-and-aft direction, means to rigidly connect the other frame with the implement, and means connected with said frames for holding them in interconnected relation.

2. In a hitch device for connecting an implement to a tractor that includes power operated elevatable lifting means, the combination of a pair of frames, one attachable to said lifting means to be raised bodily in a generally vertical direction by operation of said lifting means and the other attachable rigidly to the implement, each frame including downwardly diverging side portions and the side portions of said other frame being generally concave in section and shaped to snugly receive the side portions of said one frame, whereby by raising the latter frame into engagement with the concave portions of said other frame, said frames are rigidly interconnected, and means on said frames to hold the latter in engagement.

3. A hitch device for connecting an implement with a tractor having raising and lowering means, said device comprising a pair of normally vertical frames disposed in transverse vertical planes, the side edges of said frames diverging downwardly in parallel relation, interengageable means carried by the sides of said frame sections whereby the frame sections may be interconnected by generally vertical movement of one relative to the other, means to connect one of said frames with the tractor raising and lowering means, means to rigidly connect the other frame to the implement, and means carried by one frame and connectible with the other to hold the frames together.

4. A hitch device for connecting an implement with a tractor having raising and lowering means, said device comprising a pair of normally vertical frames, each including a pair of generally downwardly and laterally outwardly diverging rigid bars that lie in a generally transverse vertical plane, means on one frame to rigidly receive the other frame upon vertical movement relative thereto, said last mentioned means comprising flanges on one frame disposed in generally parallelism with and dimensioned to wedgingly receive the sides of the other frame, means to connect said one frame with an implement, and means to connect the other frame with the raising and lowering means of a tractor, and the pair of bars on one frame having the same angular disposition, substantially from end to end, as the pair of bars on the other frame, whereby when one frame is raised into the other, said frames are interconnected in nested relation with substantially continuous contact between said rigid bars.

5. A hitch device for connecting an implement with a tractor having raising and lowering means, said device comprising a pair of generally vertical inverted V-shaped frames, the sides of each frame comprising bars having generally laterally inwardly extending and generally laterally inwardly divergent flanges, the latter being dimensioned so that the frames may be nested together whereby one frame is adapted to snugly embrace the other upon vertical movement relative thereto, means to connect said one frame with an implement, and means to connect the other frame with the raising and lowering means of a tractor.

6. In a hitch device for connecting an implement to a tractor that includes power operated elevatable lifting means, the combination of a pair of frames, one attachable to said lifting means and the other to the implement, each of said frames normally being disposed generally vertically and each including downwardly diverging parts, the parts on one frame being shaped to snugly receive the corresponding parts of the other frame in response to upward movement of said other frame relative to said one frame, locking means connected with said frames for holding them in interlocked relation, said locking means being disposed at the forward upper portion of the tractor-carried frame, and means on the forward upper portion of the implement-carried frame for releasably receiving said locking means.

7. In a hitch device for connecting an implement to a tractor that includes power operated elevatable lifting means, the combination of a pair of frames, one attachable to said lifting means and the other to the implement, each of said frames normally being disposed generally vertically and each including downwardly diverging parts, the parts on one frame being shaped to snugly receive the corresponding parts of the other frame in response to upward movement of said other frame relative to said one frame, a notched member carried on one of said frames, and a locking part swingably mounted on the other frame and shiftable into the notch of said member for locking said frames in interlocked relation.

8. The invention set forth in claim 7, further characterized by said locking part including a first section pivoted to said other frame and a second section having means to engage opposite sides of said notched member and threaded onto said first section.

9. In a hitch device for connecting an implement to a tractor that includes power operated elevatable lifting means, the combination of a pair of A-frames, one being adapted to fit complementarily within the other and each disposable in a transverse vertical plane and arranged with its apex disposed upwardly, said lifting means including an upper hitch link and a pair of laterally spaced apart lower draft links, means connecting the rear end portion of said upper link with the apical portion of one frame, means connecting the rear portions of said lower draft links to the lower portion of said one frame at laterally spaced apart points thereon, means to rigidly connect the other frame with said implement, and means positively securing said frames together.

10. In a hitch device for connecting an implement to a tractor that includes power operated elevatable lifting means, the combination of a pair of frames, one attachable to said lifting means and the other to the implement, each of said frames including a vertical transverse frame means and one of said frame means including laterally spaced apart upwardly angled converging side portions and the other frame means also including upwardly angled converging portions whereby when the frame connected with the lifting means is elevated the associated angled frame portion cooperates with the other angled frame portion to guide the latter in a lateral direction into interengaged relation with the first mentioned one frame, and locking means connected with said frames for holding them in interlocked relation.

11. A hitch device for connecting an implement with a tractor having raising and lowering means, said device comprising a pair of interconnectible frames, each of said frames comprising a rigid structure normally disposed in a generally transverse vertical plane, means to connect one of said frames with the tractor raising and lowering means, means to connect the other frame to the implement, said other frame including a pair of laterally spaced parts that extend upwardly in a transverse plane in upwardly converging relation and said one frame including means disposable between the lower portions of the laterally spaced apart upwardly converging parts, when the tractor is backed to bring said frames into abutting relation, and said last mentioned means being engageable with said upwardly converging parts whereby raising said one frame engages said one frame with the other frame in guided relation and effects a connection between said frames that acts to align said frames laterally, said frames also including interengaging means that resists relative lateral as well as fore-and-aft displacement.

12. In a hitch device for connecting an implement to a tractor that includes power operated elevatable lifting means, the combination of a pair of frames, one attachable to the implement and the other to the lifting means, each of said frames including a vertical transverse frame means and said one frame including laterally and upwardly converging and laterally spaced apart side portions and the other frame including cooperating means adapted to be passed rearwardly, as by backing the tractor, into position between said laterally spaced apart converging portions, whereby, when said lifting means is raised, said converging portions and said cooperating means act together to shift one or the other of said frames into proper position laterally as a result of said lifting motion, and locking means connected with said frames for holding them in interlocked relation.

References Cited in the file of this patent

UNITED STATES PATENTS

| | | |
|---|---|---|
| 1,732,003 | Drumm | Oct. 15, 1929 |
| 1,818,284 | Stephens | Aug. 11, 1931 |
| 2,441,750 | Britton | May 18, 1948 |
| 2,483,565 | Strandlund | Oct. 4, 1949 |
| 2,685,453 | Kuhary et al. | Aug. 3, 1954 |

FOREIGN PATENTS

| | | |
|---|---|---|
| 225,304 | Switzerland | Apr. 16, 1943 |